United States Patent
Lookingbill et al.

(10) Patent No.: US 8,818,081 B1
(45) Date of Patent: Aug. 26, 2014

(54) 3D MODEL UPDATES USING CROWDSOURCED VIDEO

(71) Applicant: Google Inc., Mountain View, CA (US)

(72) Inventors: Andrew Lookingbill, Palo Alto, CA (US); Steven Maxwell Seitz, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/055,132

(22) Filed: Oct. 16, 2013

(51) Int. Cl.
*G06K 9/00* (2006.01)
*G06T 7/00* (2006.01)

(52) U.S. Cl.
CPC .......... *G06K 9/00214* (2013.01); *G06T 7/0077* (2013.01); *G06T 7/0075* (2013.01)
USPC .......................................................... 382/154

(58) Field of Classification Search
USPC ......... 382/154, 209, 217, 218, 219, 220, 285, 382/287, 291–297
See application file for complete search history.

(56) References Cited

U.S. PATENT DOCUMENTS

| | | | |
|---|---|---|---|
| 5,917,553 A | 6/1999 | Honey et al. | |
| 7,782,365 B2 | 8/2010 | Levien et al. | |
| 8,385,658 B2 * | 2/2013 | Elangovan et al. | 382/216 |
| 8,558,883 B2 * | 10/2013 | Cavallaro et al. | 348/135 |
| 2012/0281873 A1 | 11/2012 | Brown et al. | |
| 2012/0314096 A1 | 12/2012 | Kruglick | |
| 2013/0046461 A1 | 2/2013 | Balloga | |
| 2013/0141523 A1 | 6/2013 | Banta et al. | |

* cited by examiner

Primary Examiner — Brian Le

(74) Attorney, Agent, or Firm — Lerner, David, Littenberg, Krumholz & Mentlik, LLP (57) ABSTRACT

An exemplary method includes prompting a user to capture video data at a location. The location is associated with navigation directions for the user. Information representing visual orientation and positioning information associated with the captured video data is received by one or more computing devices, and a stored data model representing a 3D geometry depicting objects associated with the location is accessed. Between corresponding images from the captured video data and projections of the 3D geometry, one or more candidate change regions are detected. Each candidate change region indicates an area of visual difference between the captured video data and projections. When it is detected that a count of the one or more candidate change regions is below a threshold, the stored model data is updated with at least part of the captured video data based on the visual orientation and positioning information associated with the captured video data.

20 Claims, 10 Drawing Sheets

3D MODEL UPDATES USING CROWDSOURCED VIDEO

BACKGROUND

Real-world 3D models may depict objects, such as building and monuments, located at some remote or interesting geographic location. Typically, current techniques to create real-world 3D models are based on large-scale collection efforts (e.g., aerial and other imagery collected professionally). However, this can be a costly and time-consuming process. Moreover, these 3D models can become stale and inaccurate overtime due to changes at the location after the collections are complete.

BRIEF SUMMARY

Aspects of the disclosure may be advantageous for providing a scalable method of updating a 3D model of a location by using crowd-sourced imaging data. For example, by receiving video segments from a large number of users at a location, an accurate and up-to-date 3D model of that location can be maintained.

One aspect of the present technology provides a method that includes using one or more computing devices to prompt a user to capture video data at a location. The location may be associated with navigation directions for the user. The computing devices may receive the captured video data including information representing visual orientation and positioning information associated with the captured video data, and a stored data model representing a 3D geometry depicting objects associated with the location may be accessed. Using the computing devices, one or more candidate change regions may be detected between corresponding images from the captured video data and projections of the 3D geometry. Each candidate change region indicates an area of visual difference between the captured video data and the projections. When the computing devices detect that a count of the one or more candidate change regions is below a threshold, the stored model data may be updated with at least part of the captured video data based on the visual orientation and positioning information associated with the captured video data.

In one example, the positioning information associated with the captured video data overlaps with positioning information for the 3D geometry. In this example, a visual correlation may be determined between one or more objects depicted in the captured video data and one or more objects depicted in the projections.

In another example, detecting includes comparing features in a certain area of a particular image from the captured video data with features in a corresponding image from the projections to obtain a difference value.

In yet another example, updating the stored model data includes integrating images from the captured video data into the 3D geometry. An alignment of an integrated image may be determined based on a corresponding image from the projections. The alignment of the integrated images may be adjusted using the visual orientation information associated with the corresponding image from the projections.

Another aspect of the present technology provides a non-transitory computer readable medium including instructions that, when executed by one or more processors, cause the one or more processors to perform a method that includes prompting a user to capture video data at a location. The location may be associated with navigation directions for the user. The processors may receive the video data including information representing visual orientation and positioning information associated with the captured video data, and a stored data model representing a 3D geometry depicting objects associated with the location may be accessed. Using the one or more processors, one or more candidate change regions may be detected between corresponding images from the captured video data and projections of the 3D geometry. Each candidate change region indicates an area of visual difference between the captured video data and the projections. When the processors detect that a count of the one or more candidate change regions is below a threshold, the stored model data may be updated with at least part of the captured video data based on the visual orientation and positioning information associated with the captured video data.

Yet another aspect of the present technology provides a system including a memory and one or more processors coupled to the memory. The one or more processors are configured to prompt a user to capture video data at a location. The location may be associated with navigation directions for the user. Information representing visual orientation and positioning information associated with the captured video data may be received, and a stored data model representing a 3D geometry depicting objects associated with the location may be accessed. Thereafter, one or more candidate change regions may be detected between corresponding images from the captured video data and projections of the 3D geometry. Each candidate change region indicates an area of visual difference between the captured video data and the projections. When the one or more processors detect that a count of the one or more candidate change regions is below a threshold, the stored model data may be updated with at least part of the captured video data based on the visual orientation and positioning information associated with the captured video data.

DETAILED DESCRIPTION

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

The present disclosure relates generally to a scalable method of updating a 3D model of a location by using crowd-sourced images, such as images from a video segment. These images can provide information to correct, update and add to a 3D model. In some aspects, the techniques described herein may be employed as an application for use by a mobile device, such as a mobile phone. While aspects of the disclosure are discussed below in connection with certain types of mobile devices, the techniques described herein can be used in applications for other types of mobile devices, for example, a personal computer, video camera or a wearable head mounted computer that includes capabilities for capturing video/digital images.

In some embodiments, the user may have to install an application and/or select a service in order to obtain the benefits of the techniques described herein. In such embodiments, if the user has not done so, the user may not be prompted and may not have the opportunity to help update the model.

In one such embodiment, for example, users can receive directions to a specific location. In this example, when the users arrive at that location, they are may be asked to take a short video segment, which the application then uploads to a central server. This piece of video segment, depicting objects that the users saw at the location, may be used to update the 3D model of that location. In some instances, the users are prompted to generally move the mobile device around the location or to move the device in a particular way so as to capture certain parts of the location.

By receiving video segments from a large number of users at a given location, an accurate and up-to-date 3D model of the location can be maintained. In this regard, a visual correlation can be determined between one or more objects depicted in the video segments and projections (e.g., reconstructed target images) of the 3D model. These projections of the 3D model depict objects that are associated with the location. Thereupon, one or more candidate change regions are detected between corresponding images from the video segment and projections of the 3D model. Each candidate change region may indicate an area of visual difference between the corresponding images.

If a count of the one or more candidate change regions is below a certain threshold, the 3D model is then updated with at least part of the video segment. For example, images from the video segment are integrated into the 3D model based on the visual orientation and positioning information associated with the video segment. If the count of the one or more candidate change regions meets or exceeds the certain threshold, the video segment may not be used to update the 3D model or may be otherwise discarded. An advantage of updating the 3D model in this manner is to ensure that changes applied to the 3D model based on new video segments are done gradually.

As noted above, in some embodiments, in order to obtain the benefits of the techniques described herein, users may be required to select a setting and/or install an application. In addition, certain data may be treated in one or more ways before it is stored or used, so that personally identifiable information is removed. For example, a user's identity may be treated so that no personally identifiable information can be determined for the user, or a user's current and historical location may be generalized where location information is obtained (such as to a city, ZIP code or state level), so that a particular location of a user cannot be determined.

Figure 1:
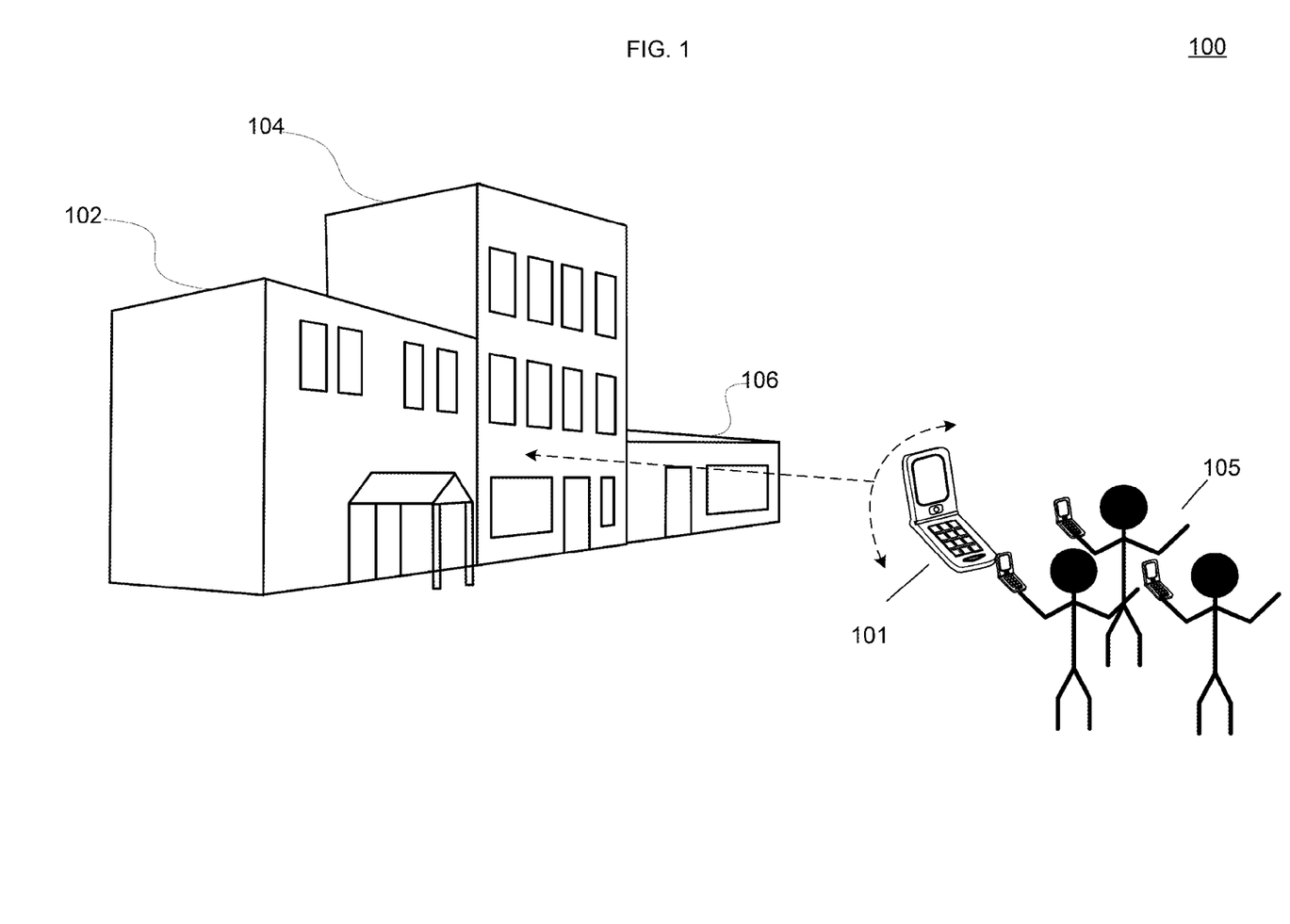
FIG. 1 is an illustration of an image capture process in accordance with aspects of the disclosure.

FIG. 1 is an illustration of an image capturing process 100 that may be employed. In many situations, users are able to use a mobile device to get directions to the location. For example, a user may input into an application installed on the mobile device, a request for directions to a location, such as to famous restaurant. In return, the application may display turn-by-turn directions to that location on a display screen of the device.

Using the same or another device, the user upon arrival at the location may take video segments of their surroundings. For example, as shown in FIG. 1, one or more of users 105 may use a device, such as mobile device 101, to capture images of objects (e.g., buildings 102, 104 and 106) at their location. The video segments taken by the users 105 may capture images of people, places or things of interest at the location in an angle generally perpendicular to the ground, or where the mobile device 101 is positioned at or near ground level.

In some situations, the users 105 may be prompted to capture images of their surroundings once they arrive at the location. For example, an application installed on mobile device 101 may prompt one or more of the users 105 to take a short video segment in a general or specific direction at the location. The images may capture objects at the location that may be of interest to the users 105 or other users of the application. The arrival of a user at the location may be detected based on, for example, a global positioning service (e.g., GPS). In this regard, the mobile device 101 may be equipped with GPS components that may be used to determine when one or more of the users 105 have arrived at the location.

With a number of users capturing images of their surroundings at a location, these images can be used to update and maintain a 3D model associated with that location. To capture the images, the user's mobile device may be equipped with a camera or other types of image capturing components incorporated into the device. For example, mobile device 101 may include a camera capable of capturing digital images of objects, such as a digital still camera, digital video camera and/or image sensor. These images may be stored in conventional formats, such as JPEG or MPEG, or other types of formats. The images may be stored locally in a memory of the mobile device 101, such as in RAM or on a flash card. Alternatively, the images may be captured and stored remotely.

As noted above, users of mobile devices may capture images of people, places or things of interest at different locations. Typically, the images can contain as many objects associable with the location (such as street lights, signs and advertisements, mountains, trees, sculptures, bodies of water, storefronts, etc.) in as much detail as may be captured by an imaging capturing device. In addition to being associated with a location, the images may also be associated with information indicating the orientation of the images. For example, the orientation of the images may simply correspond to a camera angle, such as an angle that is 30° East of true North and rises 2° from ground level. If the images are 360° panoramas centered at a location, the orientation may indicate the portion of the images that correspond with looking due North from a camera position at an angle directly parallel to the ground.

Figures 2A, 2B:
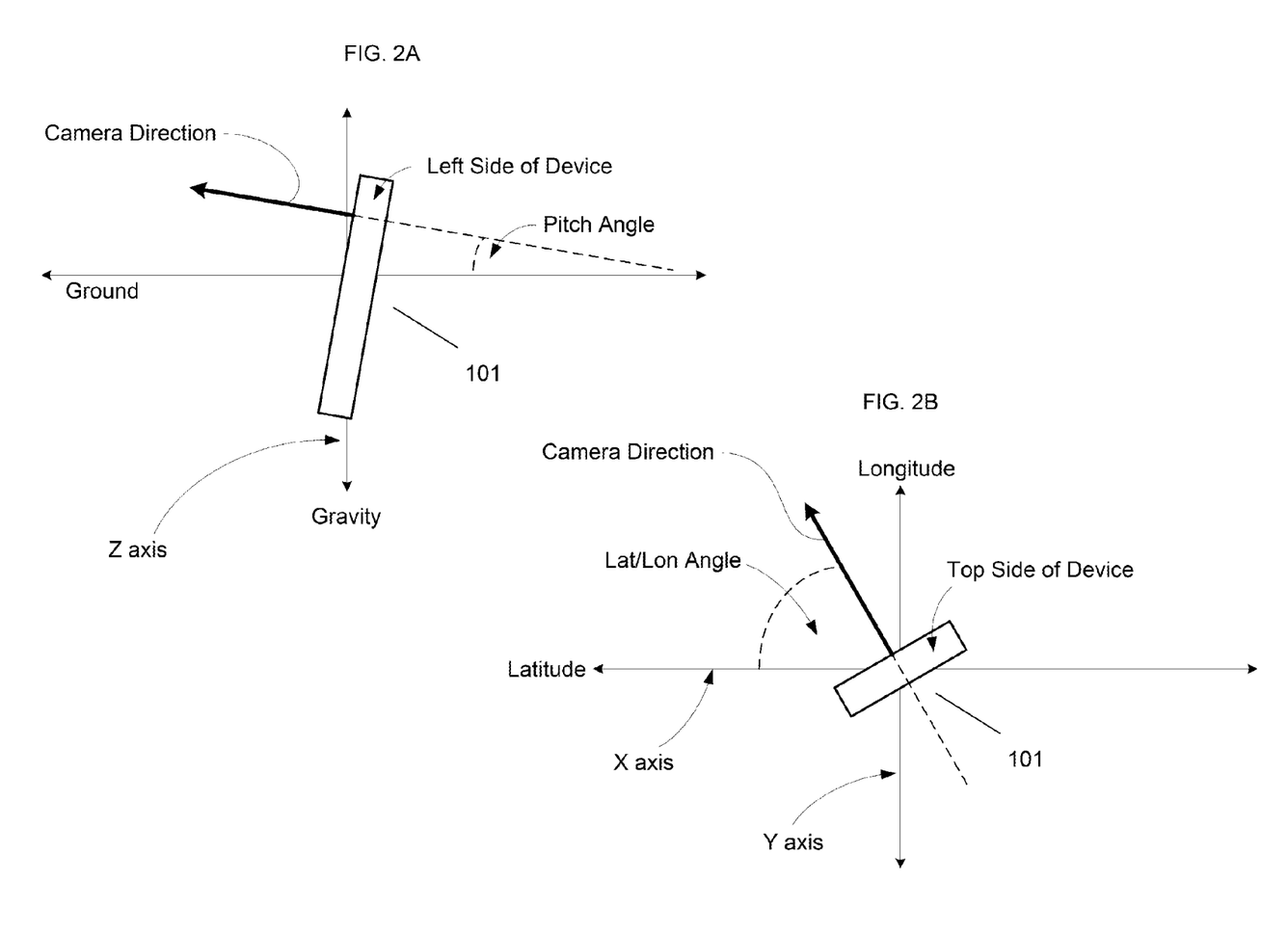
FIGS. 2A-B illustrates orientation parameters for a device in accordance with aspects of the disclosure.

In FIGS. 2A-B, an illustration of camera orientation parameters for a device, such as mobile device 101 in FIG. 1, is shown. The camera orientation parameters can be expressed in three dimensions, such as X, Y and Z axes, where the X axis represents a latitude position, the Y axis represents a longitude position and the Z axis represents a position of the device relative to a plane perpendicular to the direction of gravity, e.g., ground. It shall be assumed for ease of understanding and not limitation that the camera angle is fixed relative to the orientation of the device 101. In that regard, FIG. 2A illustrates a potential pitch angle of the device 101 (as seen looking towards the left side of the device) relative to the ground).

FIG. 2B illustrates a potential latitude/longitude angle of the device 101 (as seen looking down towards the top side of the device), e.g., the camera direction in which the camera points relative to the latitude and longitude. Collectively, the pitch and latitude/longitude angle define a camera pose or location and orientation. The roll (rotation about the Y axis of device 101), yaw/azimuth and/or altitude may also be captured. This and other image-related information may be outputted as numerical values by an accelerometer (not shown) or other component in the device 101, used by the device's processor, and stored in the memory of the device 101.

Once the images are captured, they can be used to access and update a 3D data model associated with the location. For example, an application may be employed to identify information about the images, such as a location and visual orientation of the objects in the images. Then, relevant information concerning the images may be provided to a system for identifying a corresponding data model of a location where the images were taken. An example of a system for processing these types of images used for updating a data model is further described below with respect to FIG. 3.

Figure 3:
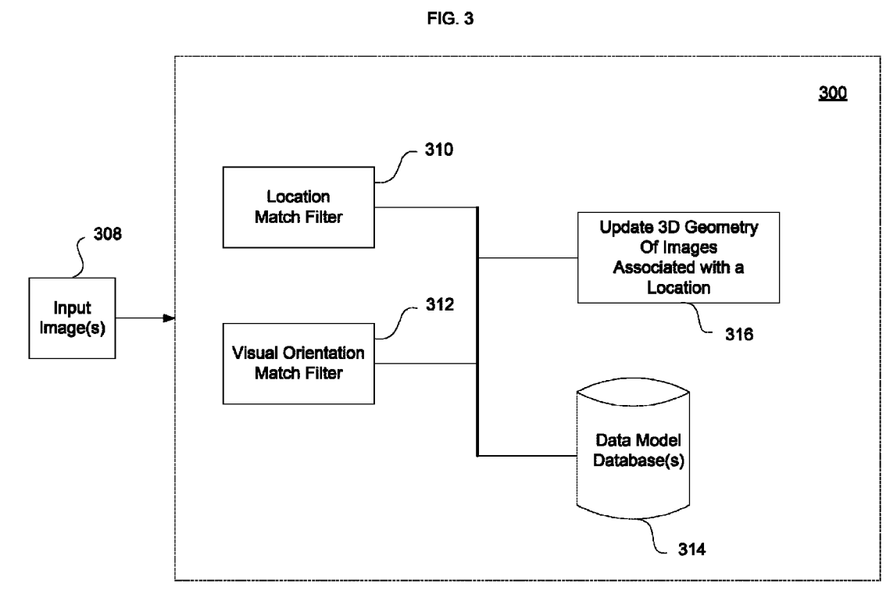
FIG. 3 is an illustration of an image processing system in accordance with aspects of the disclosure.

FIG. 3 illustrates an image processing system 300 for receiving a number of input images 308, analyzing the imagery for relevant information and updating a data model associated with a location depicted in the images 308. As shown, the system 300 may have a number of filtering modules to identify a location and a visual orientation associated with the input images 308. For example, the modules may include a location match filter 310 to determine a location associated with an input image and a visual orientation filter 312 to determine an orientation of objects depicted in the image. Other filter modules (not shown) may also be employed. The filter modules may employ different techniques for analyzing images. For instance, the visual orientation filter 312 may include software for analyzing an orientation of objects depicted in an input image.

The modules are shown as being connected to one or more data model databases 314. These databases may store data models associated with a location that may correspond to where the input images 308 were captured. These modules may operate in series or parallel fashion. Another module 316 of system 300 may use the results of the filtering modules, for example, to update, correct and add to the data models in the data model databases 314 that are associated with a location.

To locate a data model that corresponds to the input images, system 300 may use the results of the location match filter 310. For example, the system 300 may select a data model that includes positioning information located within an overlap area of the positioning information associated with input images 308. Thereafter, image projections associated with the data models may be used to reconstruct a target image that depicts a particular view of the location represented by the data model. This process for reconstructing a target image based on a data model is described in further detail below with respect to FIG. 4.

Figure 4:
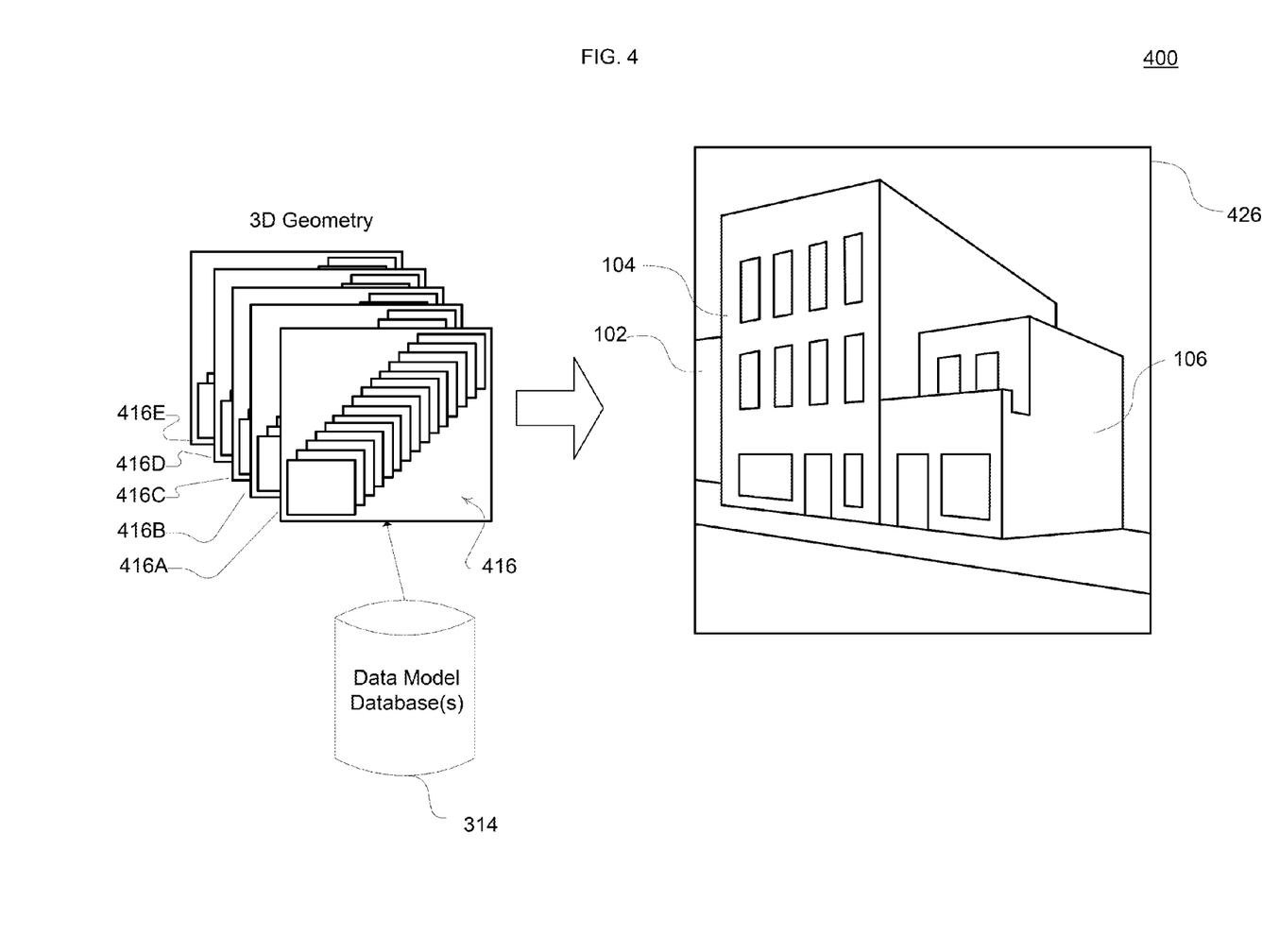
FIG. 4 is an illustration of aspects of the image processing system of FIG. 3 in accordance with aspects of the disclosure.

FIG. 4 illustrates of aspects 400 of the image processing system 300 of FIG. 3 as described above. As shown, the 3D geometry 416 associated with a data model may include a number of image projections 416A-E. Each image projections may include several related images that were captured, for example, in a video segment. When the image projections 416A-E are assembled using information stored with each related image, a target image 426 may be reconstructed depicting objects (e.g., building 102-106) at the location where the related images were taken. In order to determine whether a data model corresponds to a set of input images captured at a location, the input images may be compared to the 3D geometry 416 associated with the data model.

Figure 5:
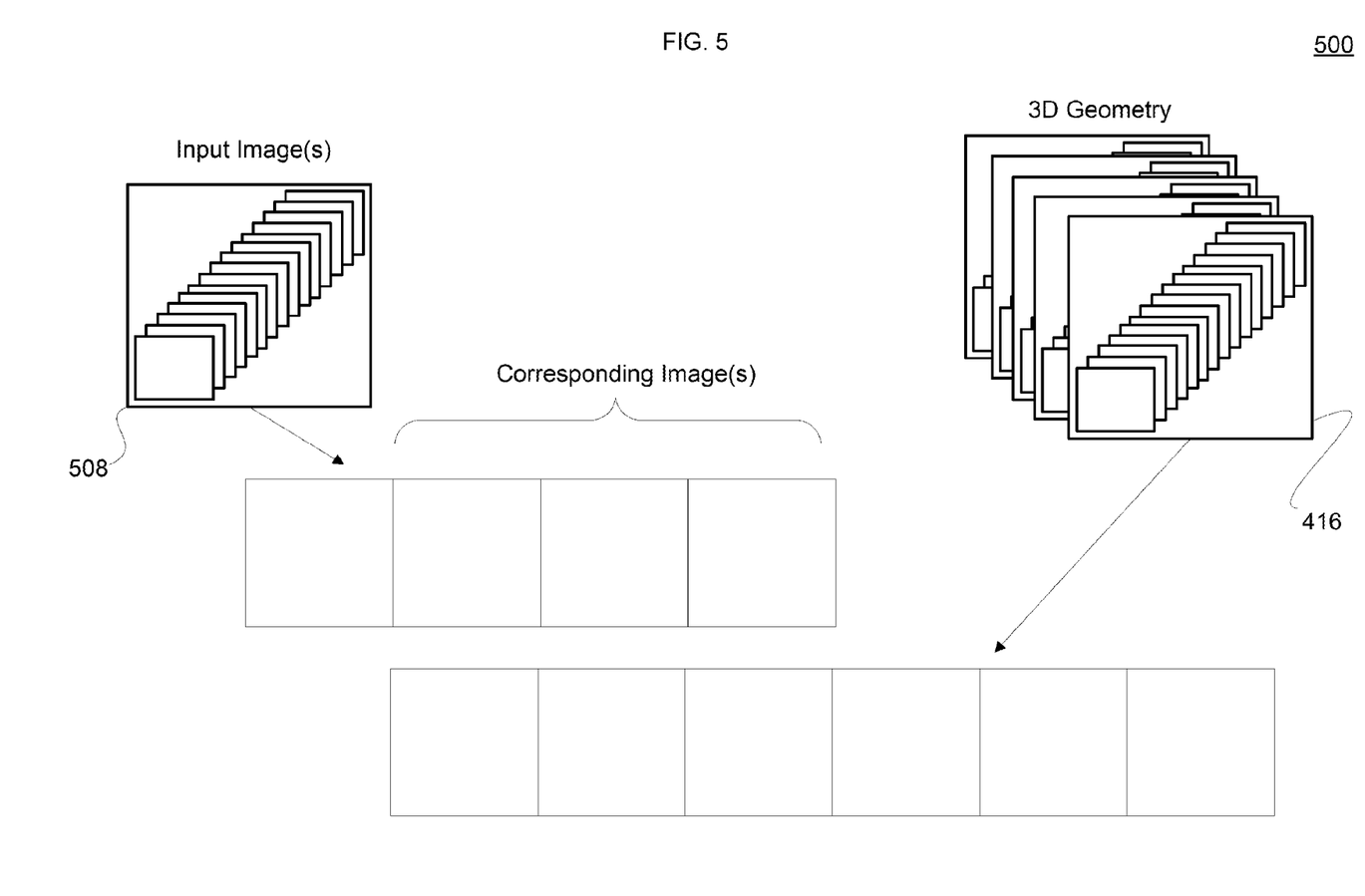
FIG. 5 is an illustration of an image comparison technique in accordance with aspects of the disclosure.

FIG. 5 illustrates an image comparison technique 500. As shown, one or more of the input images 508 may be compared to image projections of a 3D geometry 416. A correspondence between the input images 508 and the image projections may be determined based on information associated with both images. This information can include visual orientation information that may indicate a visual orientation of objects depicted in the images. If the visual orientation information associated with the input images 508 and image projections agree, then one or more of the input image 508 corresponds to one or more images from the image projections.

In some aspects, a further correspondence between the input images 508 and image projections may be determined by analyzing a visual correlation between objects depicted in both images. In that regard, certain objects depicted in the input images 508, such as cars and people, may be removed or otherwise ignored or the input images 508 may be preprocessed in order to simplify comparison of the input images 508 with the image projections.

If there are no corresponding images determined between the input images 508 and image projections of the 3D geometry 416, then the input images 508 may be discarded or in some instances they can be used to model new images of the location that were not previously integrated into the data model. If a correspondence between the input images 508 and image projections of the 3D geometry 416 is determined, then the corresponding images are analyzed to locate a number of change regions.

Figure 6:
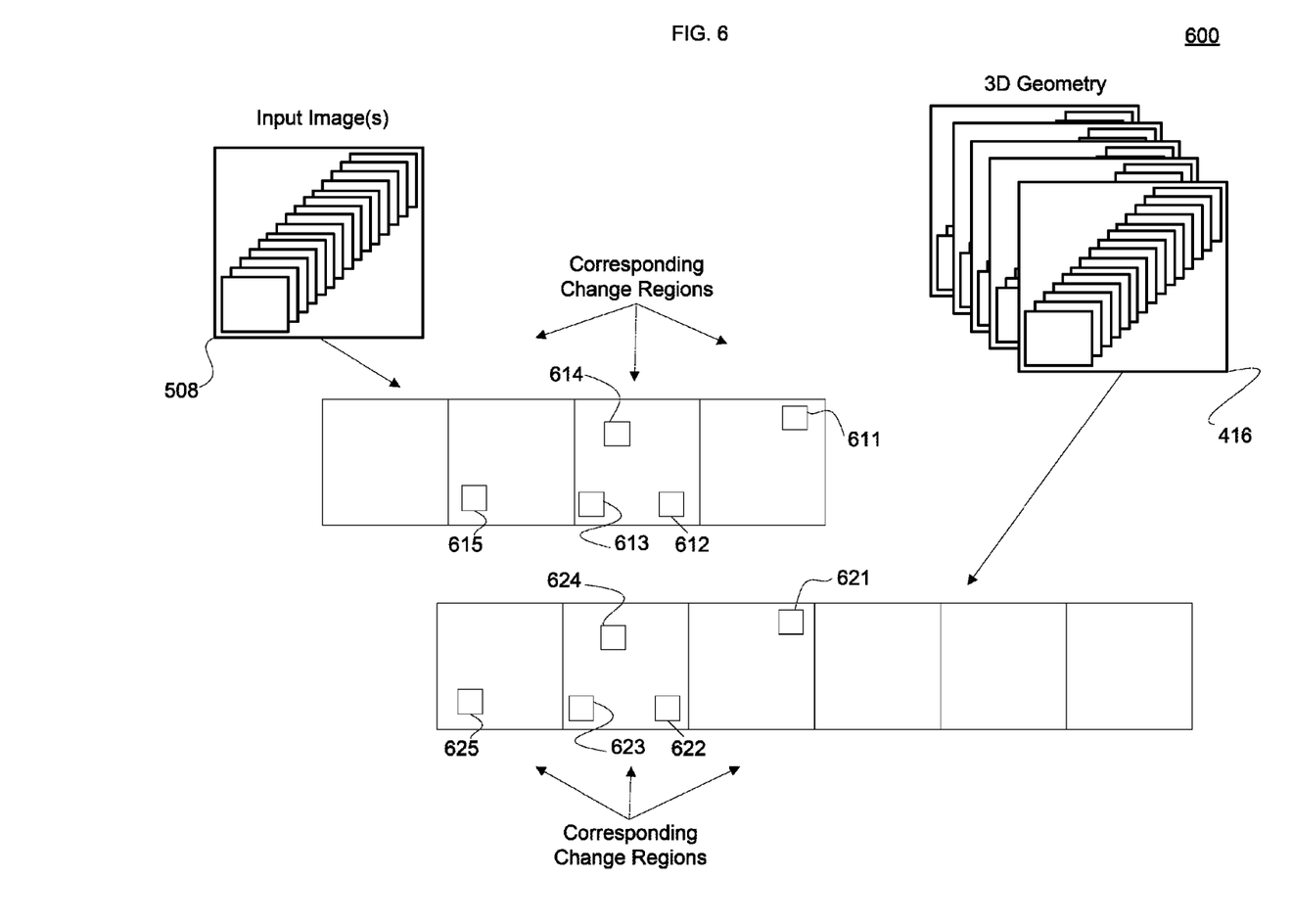
FIG. 6 is an illustration of an image analysis technique in accordance with aspects of the disclosure.

FIG. 6 illustrates an image analysis technique 600. As shown, a number of change regions 611-615 and 621-625 may be determined amongst the input images 508 and image projections of the 3D geometry 416. Each change region represents a candidate area indicating an area of visual different between corresponding areas of the input images 508 and the image projections. For example, as shown in FIG. 6, change region 615 from the input images 508 may correspond to an particular area of the image projections of the 3D geometry 416 represented by change region 625.

A score for the corresponding change regions may be determined based on the image analysis. For example, the score may be based on a correlation between differences in visual features of objects depicted in the corresponding images. The score can be further or alternatively based on a correlation between other image information and objects depicted in the images or other conventional image analysis methods. If the score for a particular corresponding change region meets a certain level, it can be determined that a particular area of the location covered by the change region has significantly changed.

If a count of the change regions determined by the image analysis is below a pre-determined threshold level, then the data model may be updated with one or more of the input images 508. This may ensure that changes to the 3D model are applied gradually. Alternatively, if a count of the change regions meets or exceeds the pre-determined threshold level, the input images 508 will not be used to update the data model and may be discarded.

Figure 7:
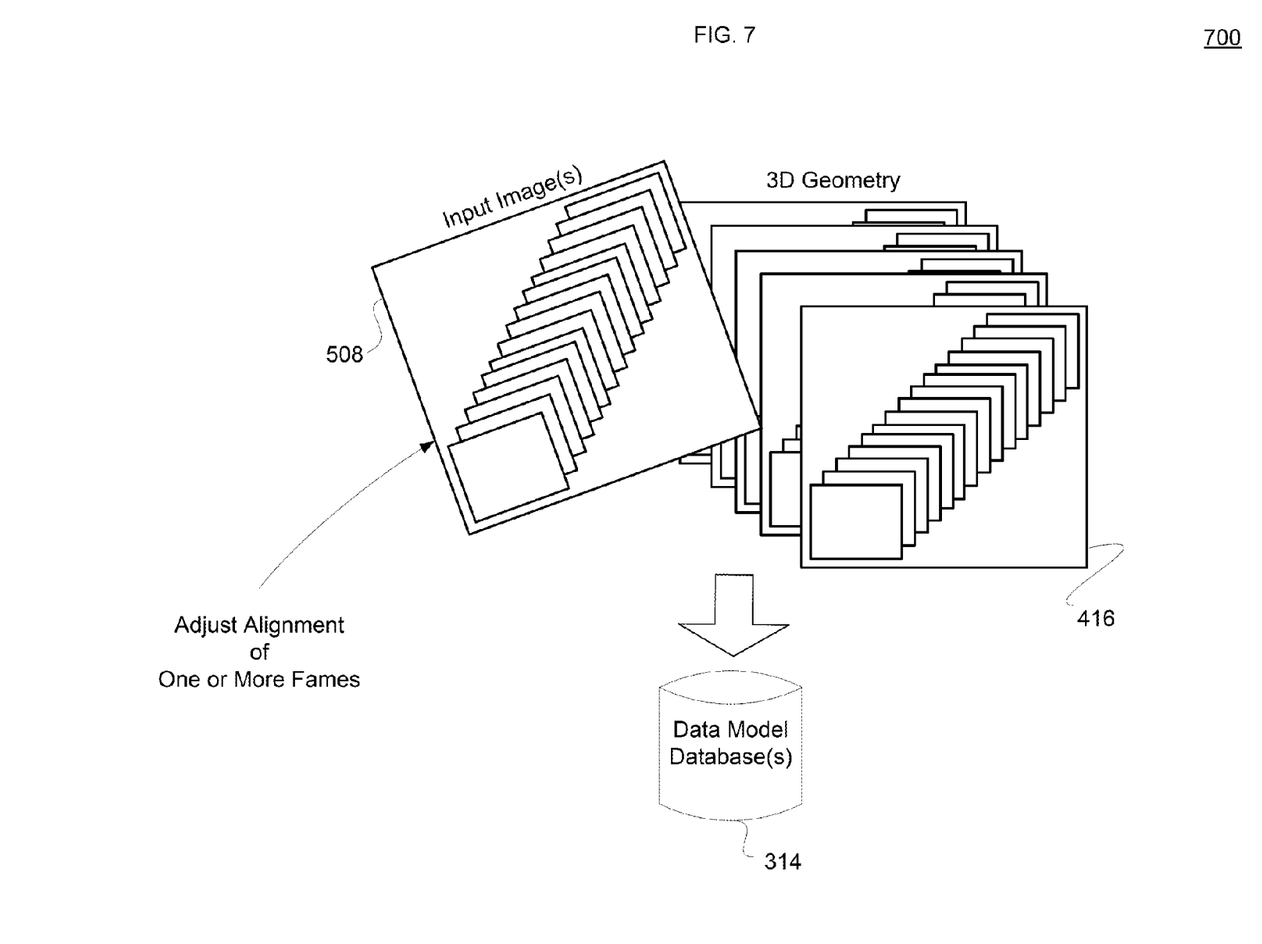
FIG. 7 is an illustration of an updating technique in accordance with aspects of the disclosure.

FIG. 7 illustrates an updating technique 700 that may be used, for example, to update a data model of a location. To update a data model of a location stored in a data model database 314, one or more input images 508 may be integrated into a 3D geometry of images 416 associated with the data model. As discussed above, this update may be based on the visual orientation and positioning information associated with the input images 508 and similar information for corresponding images from the 3D geometry 416. In some instances, an alignment of the input images 508 may be adjusted so that the images can be seamlessly integrated into the data model. For instance, an alignment of the input images 508 may involve updating and/or correcting a viewing angle of the input images 508 to correspond with image projections of the 3D geometry 416 associated with the data model.

While it can be possible to perform aspects of the image processing as described above with an application installed locally on a mobile device, such as mobile phone, it may be more feasible to do the processing remotely as well as locally (or some combination thereof). For instance, a remote computing device like an application server may perform some or all aspects of the image processing.

Figure 8:
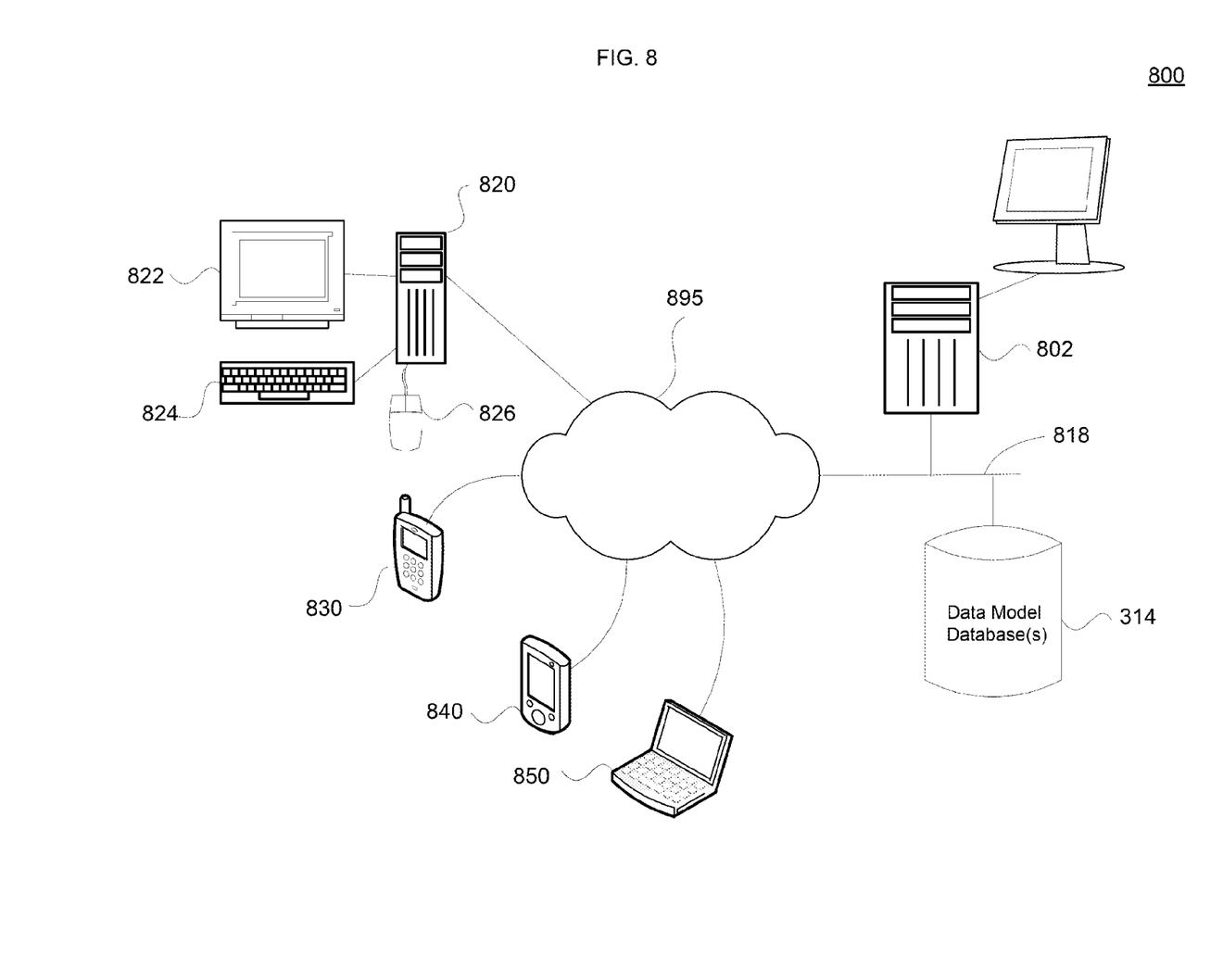
FIG. 8 is a pictorial diagram of a system in accordance with aspects of the disclosure.

FIG. 8 illustrates an example of a system 800 including computing devices for performing aspects of the present disclosure. As shown, system 800 depicts various computing devices that can be used alone or in a networked configuration. For example, this figure illustrates a computer network having a plurality of computers 802 and 820 as well as other types of mobile devices like a mobile phone 830, a PDA 840 and a laptop/netbook 850. These various devices may be interconnected via a local bus or direct connection 818 and/or may be coupled via a communications network 895 such as a LAN, WAN, the Internet, etc. and which may be wired or wireless.

Each computing device may include, for example, user input devices such as a keyboard 824 and mouse 826 and/or various other types of input devices such as pen-inputs, joysticks, buttons, touch screens, etc., as well as a display 822, which could include, for instance, a CRT, LCD, plasma screen monitor, TV, projector, etc. Each computer 802 and 820 may be a personal computer, application server, etc. By way of example only, computer 820 may be a personal computer while computer 802 may be a server. Databases such as data model database 314 are accessible to one or more of the servers or other devices of system 800.

Figure 9:
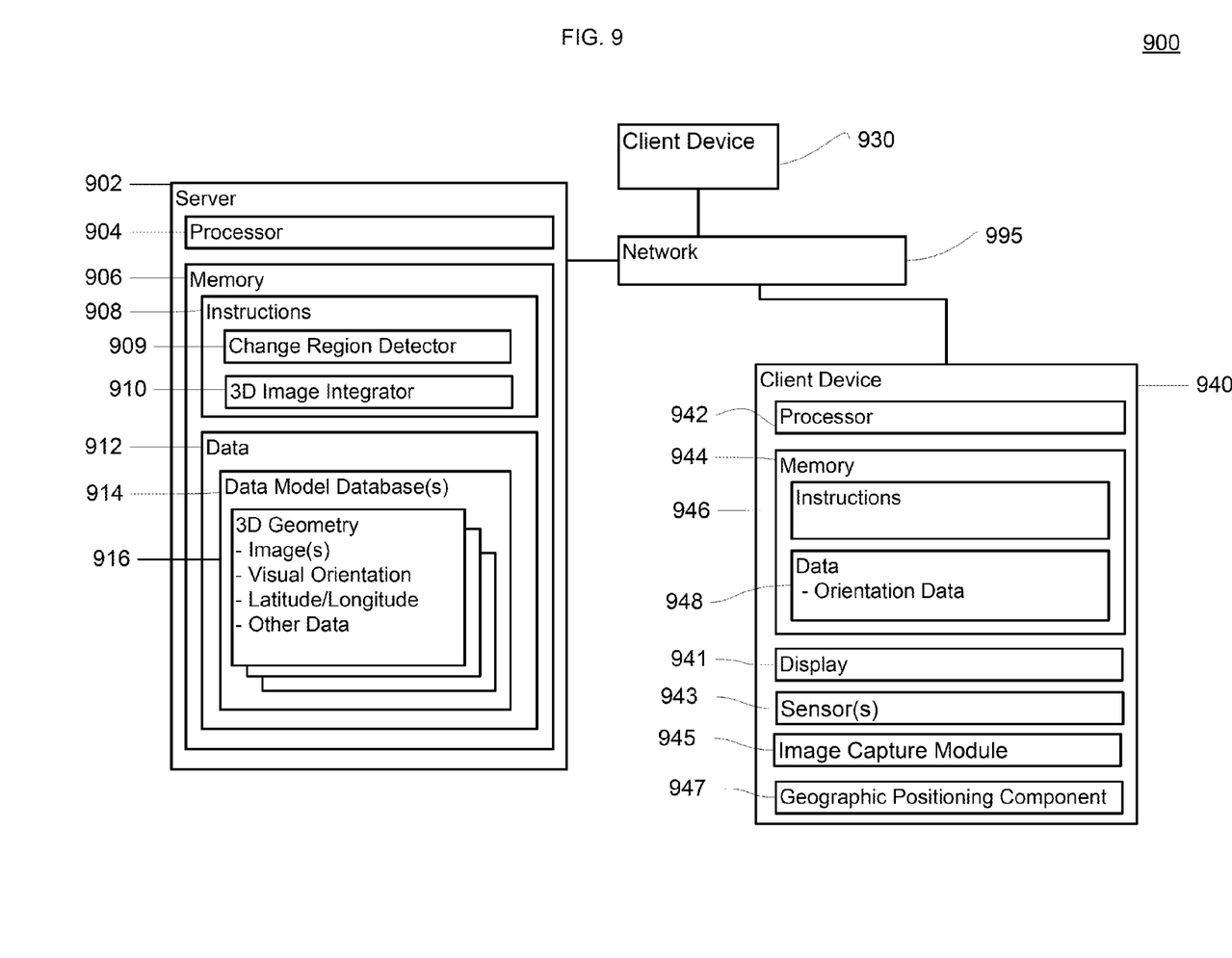
FIG. 9 is a block diagram of a system in accordance with aspects of the disclosure.

FIG. 9 is a block diagram of a system 900, which may be used to maintain a data model database as described herein. As shown, the system 900 includes a server 902 coupled to a network 995 and a number of client devices, such as client devices 930 and 940, capable of communicating with the server 902 over the network 995. The server 902 may include a processor 904, memory 906, and other components typically present in general purpose computers.

The memory 906 of server 902 may store information that is accessible by the processor 904, including instructions 908 that may be executed by the processor 904, and data 912. The memory 906 may be of a type of memory operative to store information accessible by the processor 904, including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The subject matter disclosed herein may include different combinations of the foregoing, whereby different portions of the instructions 908 and data 912 are stored on different types of media.

Although FIG. 9 functionally illustrates the processor 904 and memory 906 as being within the same block, the processor 904 and memory 906 may actually include multiple processors and memories that may or may not be stored within the same physical housing. For example, some of the instructions 908 and data 912 may be stored on removable CD-ROM and others within a read-only computer chip. Some or all of the instructions and data may be stored in a location physically remote from, yet still accessible by, the processor 904. Similarly, the processor 904 may actually comprise a collection of processors, which may or may not operate in parallel.

Data 912 may be retrieved, stored or modified by processor 904 in accordance with the instructions 908. For instance, although the present disclosure is not limited by a particular data structure, the data 912 may be stored in computer registers, in a relational database as a table having a plurality of different fields and records, XML documents, or flat files. The data 912 may also be formatted in a computer-readable format such as, but not limited to, binary values, ASCII or Unicode. By further way of example only, the data 912 may be stored as bitmaps comprised of pixels that are stored in compressed or uncompressed, or various image formats (e.g., JPEG), vector-based formats (e.g., SVG) or computer instructions for drawing graphics. Moreover, the data 912 may comprise information sufficient to identify the relevant information, such as numbers, descriptive text, proprietary codes, pointers, references to data stored in other memories (including other network locations) or information that is used by a function to calculate the relevant data.

Data model databases 914 of server 902 may store data models representing a 3D model of a location, which may be transmitted to client devices 930 and 940. Each data model may be associated with a 3D geometry of images that include images captured at the location. Image projections from the 3D geometry may be used to reconstruct a target image that depicts object at that location. The data model databases 914 can include information relevant the 3D geometry of images, such as visual orientation information, latitude/longitude coordinates representing locations where the images were captured as well as other types of relevant data. Although the subject matter disclosed herein is not limited to a particular positional reference system, for ease of understanding latitude/longitude positions may be used when referencing locations associated with data models.

The server 902 may be at one node of network 995 and capable of directly and indirectly communicating with other nodes of the network 995. For example, the server 902 may include a web server that may be capable of communicating with client devices 930 and 940 via network 995 such that it uses the network 995 to transmit and display information to a user on a display 941 of the client device 940. Server 902 may also include a plurality of computers, e.g., a load balanced server farm, that exchange information with different nodes of a network for the purpose of receiving, processing and transmitting data to client devices 930 and 940. In this instance, the client devices 930 and 940 will typically still be at different nodes of the network 995 than the computers comprising server 902.

The network 995, and intervening nodes, may include various configurations and protocols including the Internet, World Wide Web, intranets, virtual private networks, wide area networks, local networks, private networks using communication protocols proprietary to one or more companies, Ethernet, WiFi (e.g., 802.11, 802.11b, g, n, or other such standards), HTTP, and various combinations of the foregoing. Such communication may be facilitated by a device capable of transmitting data to and from other computers, such as modems (e.g., dial-up, cable or fiber optic) and wireless interfaces.

Although certain advantages are obtained when information is transmitted or received as noted above, other aspects of the subject matter disclosed herein are not limited to a particular manner of transmission of information. For example, in some aspects, information may be sent via a medium such as a disk, tape or CD ROM. Yet further, although some functions are indicated as taking place on a single server having a single processor, various aspects may be implemented by a plurality of servers, for example, communicating information to client devices 930 and 940 over network 995.

Each client device 930 and 940 may be configured similarly to the server 902, with a processor 942, memory 944, instructions 946, data 948 and all of the internal components normally found in a personal computer. By way of example only, the client device 940 may include a central processing unit (CPU), display device 941 (for example, a monitor having a screen, a projector, a touch-screen, a small LCD screen, a television, or another device such as an electrical device that is operable to display information processed by the processor 612), CD-ROM, hard-drive, user input (not shown), such as a keyboard, mouse, touch-screen or microphone, speakers, modem and/or network interface device (telephone, cable or otherwise) and all of the components used for connecting these elements to one another.

The client device 940 may be a computing device. For example, client device 940 may be a laptop computer, a netbook, a desktop computer, and a portable personal computer such as a wireless-enabled PDA, a tablet PC or another type of computing device capable of obtaining information via a network like the Internet. Although aspects of the disclosure generally relate to a single client device 940, the client device 940 may be implemented as multiple devices with both portable and non-portable components (e.g., software executing on a rack-mounted server with an interface for gathering location information).

Although the client devices 940 may include a full-sized personal computer, the subject matter of the present disclosure may also be used in connection with mobile devices capable of wirelessly exchanging data. For example, client device 940 may be a wireless-enabled mobile device, such as a Smartphone, or an Internet-capable cellular phone. In either regard, the user may input information using a small keyboard, a keypad, a touch screen or other means of user input. In various aspects, the client devices and computers described herein may comprise a device capable of processing instructions and transmitting data to and from humans and other devices and computers.

The client device 940 may include a geographic positioning component 947, such as circuits, to determine a geographic location of the device 940. For example, the client device 940 may include a GPS receiver to determine the device's latitude and longitude position. As the client device 940 changes location, for example, by being physically moved, the GPS receiver may determine a new current location. By way of example only, the component 947 may include software for determining the position of the device based on other signals received at the client device 940, such as signals received at a cell phone's antenna from one or more cell phone towers if the mobile device is a cell phone. In that regard, the provision of location identification data may occur automatically based on information received from such a component.

As shown in FIG. 9, the client device 940 may also include an image capture module 945. The image capture module 945 can be used to capture video and/or still images of an object. The image capture module 945 may be a software module operable in conjunction with a video camera or may include a video graphing device, such as a video digital camera having image processing components. For example, the client device 940 may be connected to a video digital camera that can operate in conjunction with the image capture module 945. The image capture module 945 can also operate in conjunction with other image capturing systems known in the arts such as a digital camera with image and/or video capture capabilities, a camera in a mobile phone, a video camera or other devices with image capturing features.

To determine the direction in which the client device 940 is oriented, for example, when capturing an image with the image capture module 945, the client device 940 may include one or more sensors 943 such as an accelerometer, gyroscope, compass, or any combination of these. For example, an accelerometer may be used to detect an orientation of the client device 940. By way of example only, the client device 940 may use input from the accelerometer to determine the client device's pitch, yaw or roll (or changes thereto) relative to the direction of gravity or a plane perpendicular thereto. In that regard, it will be understood that a client device's provision of orientation data as set forth herein may be provided automatically to the client device 940. The orientation data received from the one or more sensors 943 may be used in various ways. For example, the orientation data may be associated with images captured by the image capture module 945. This orientation data may indicate a visual orientation of captured images with respect to the direction of the client device 940 when the images were taken at a location.

The instructions 946 of the client device 940 may be a set of instructions to be executed directly (such as machine code) or indirectly (such as scripts) by the processor. In that regard, the terms "instructions," "steps" and "programs" may be used interchangeably herein. The instructions 616 may be stored in object code format for direct processing by the processor, or in another computer language including scripts or collections of independent source code modules that are interpreted on demand or compiled in advance. Functions, methods and routines of the instructions are explained in more detail below.

In order to facilitate the 3D data model updating operations of system 900, the server 902 may further include a change region detector 909 for detecting an area of visual difference between input images and corresponding images from a data model and a 3D image integrator for integrating the captured images into the data model. The functionally of these modules can exist in a fewer or greater number of modules than what is shown, with such modules residing at one or more computing devices, which may be geographically dispersed. The modules may be operable in conjunction with client device 940 from which it may receive images depicting locations and relevant information regarding those images. Thereupon, these images may be used to update and maintain data models associated with the locations.

Techniques for maintaining a data model of a location, for example using system 900 discussed above, will now be described. It should be understood that the following operations do not have to be performed in the precise order described below. Rather, as mentioned above, various operations can be handled in a different order or simultaneously, and operations may be added or omitted.

Figure 10:
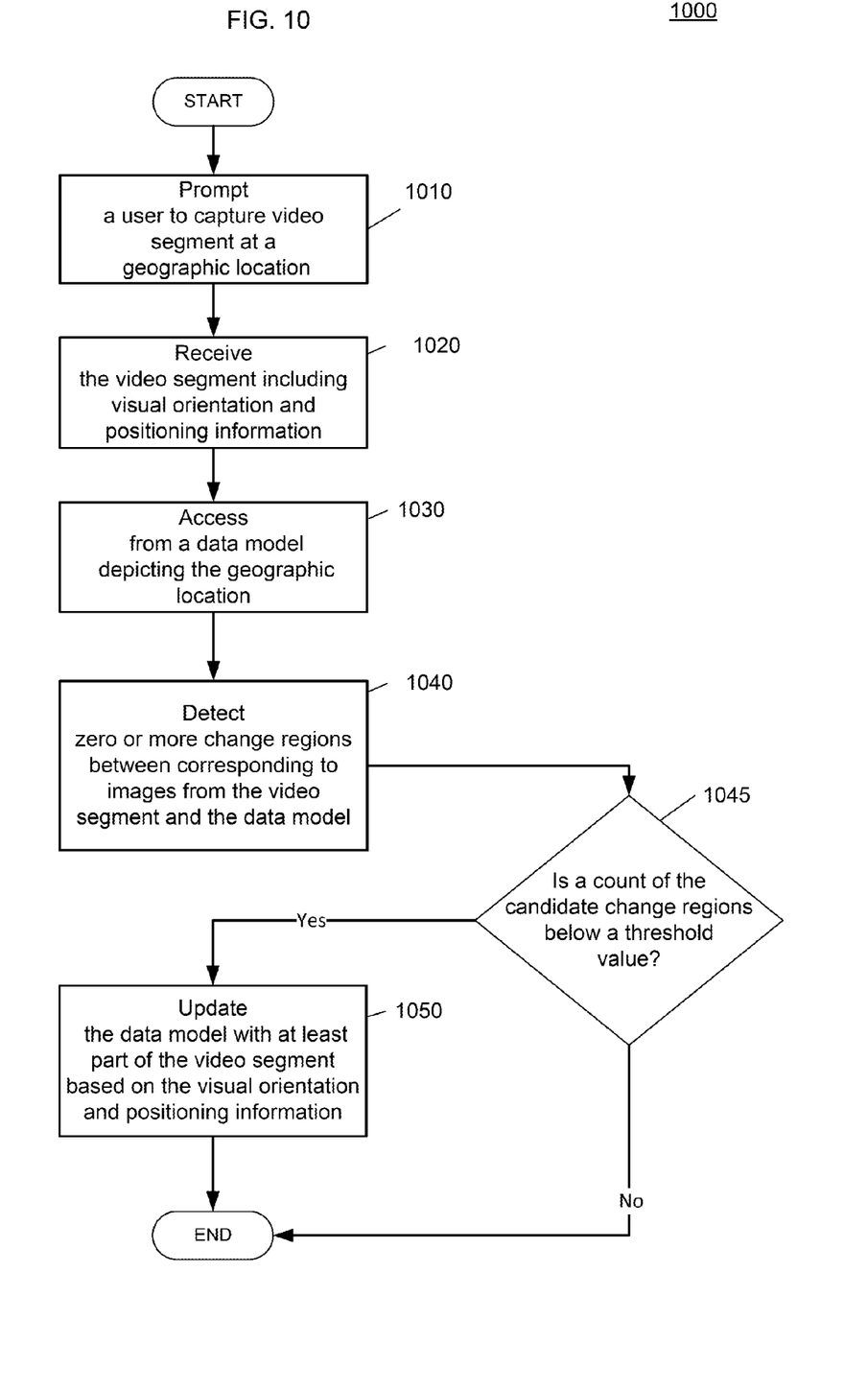
FIG. 10 is a flow diagram of a method in accordance with aspects of the disclosure.

FIG. 10 is a flow diagram 1000 depicting an example of some of the aspects described above. At stage 1010, a user may be prompted to capture a video segment at a location. For example, an application installed on a user's mobile device may prompt the user to take a short video segment at a location. This video may include images depicting objects at the location that may be of interest to the user.

At stage 1020, the video segment captured at stage 1010 may be received. This video segment may include visual orientation and positioning information associated with the location. For example, the positioning information may indicate a latitude/longitude position associated with a location the segment was captured. The visual orientation information may indicate a visual orientation of objects depicted in the images with respect to the direction of a camera that may be associated with the user's mobile device.

At stage 1030, a data model depicting the location may be accessed. For example, a data model may be selected from a database where the positioning information associated with the data model overlaps with the positioning information associated with the video segment.

At stage 1040, one or more change regions may be detected between corresponding images from the video segment and the data model. Each change region represents a candidate area indicating an area of visual different between images of the video segment and image projections of a 3D geometry associated with the data model.

At stage 1045, it is determined whether a count of the candidate change regions is below a threshold value. If the count of the candidate change regions is below a threshold value, the method 1000 may automatically stop. Otherwise, method 1000 may continue onto stage 1050.

At stage 1050, the data model may be updated with at least part of the video segment based on the visual orientation and positioning information associated with the video segment. For example, one or more of the images from the video segment may be integrated into a 3D geometry of images associated with the data model.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer-implemented method, comprising:
    prompting, using one or more computing devices, a user to capture video data at a location, the location being associated with navigation directions for the user;
    receiving, by the one or more computing devices, the captured video data including information representing visual orientation and positioning information associated with the captured video data;
    accessing, by the one or more computing devices, a stored data model representing a 3D geometry depicting objects associated with the location;
    detecting, by the one or more computing devices, one or more candidate change regions between corresponding images from the captured video data and projections of the 3D geometry, each candidate change region indicating corresponding area of visual difference in visual features of objects depicted in the captured video data and the projections; and
    when the one or more computing devices detect that a count of the one or more candidate change regions is below a threshold, updating the stored model data with at least part of the captured video data based on the visual orientation and positioning information associated with the video data.

2. The method of claim 1, wherein the positioning information associated with the captured video data overlaps with positioning information for the 3D geometry.

3. The method of claim 2, further comprising determining, by the one or more computing devices, a visual correlation between one or more objects depicted in the captured video data and one or more objects depicted in projections.

4. The method of claim 1, wherein the detecting comprises comparing features in a certain area of a particular image from the captured video data with features in a corresponding image from the projections to obtain a difference value.

5. The method of claim 1, wherein updating the stored model data comprises:
    integrating images from the video data into the 3D geometry, and
    gradually applying visual changes from the integrated images to the 3D geometry.

6. The method of claim 5, further comprising determining an alignment of an integrated image based on a corresponding image from the projections.

7. The method of claim 6, further comprising adjusting, by the one or more computing devices, the alignment of the integrated images using the visual orientation information associated with the corresponding image from the projections.

8. A non-transitory computer readable medium, storing instructions that, when executed by one or more processors, cause the one or more processors to perform a method, the method comprising:
    prompting, using one or more computing devices, a user to capture video data at a location, the location being associated with navigation directions for the user;
    receiving, by the one or more computing devices, the captured video data including information representing visual orientation and positioning information associated with the captured video data;
    accessing, by the one or more computing devices, a stored data model representing a 3D geometry depicting objects associated with the location;
    detecting, using the one or more computing devices, one or more candidate change regions between corresponding images from the captured video data and projections of the 3D geometry, each candidate change region indicating corresponding area of visual difference in visual features of objects depicted in the captured video data and the projections; and
    when the one or more computing devices detect that a count of the one or more candidate change regions is below a threshold, updating the stored model data with at least part of the captured video data based on the visual orientation and positioning information associated with the video data.

9. The non-transitory computer readable medium of claim 8, wherein the positioning information associated with the captured video data overlaps with positioning information for the 3D geometry.

10. The non-transitory computer readable medium of claim 9, wherein the further comprising determining, by the one or more computing devices, a visual correlation between one or more objects depicted in the captured video data and one or more objects depicted in the projections.

11. The non-transitory computer readable medium of claim 8, wherein the detecting comprises comparing features in a certain area of a particular image from the captured video data with features in a corresponding image from the projections to obtain a difference value.

12. The non-transitory computer readable medium of claim 8, wherein updating the stored model data comprises:
   integrating images from the video data into the 3D geometry, and
   gradually applying visual changes from the integrated images to the 3D geometry.

13. The non-transitory computer readable medium of claim 8, further comprising determining an alignment of an integrated image based on a corresponding image from the projections.

14. A system, comprising:
   a memory; and
   one or more processors coupled to the memory, the one or more processors being configured to:
   prompt a user to capture video data at a location, the location being associated with navigation directions for the user;
   receive the captured video data including information representing visual orientation and positioning information associated with the captured video data;
   access a stored data model representing a 3D geometry depicting objects associated with the location;
   detect one or more candidate change regions between corresponding images from the captured video data and projections of the 3D geometry, each candidate change region indicating corresponding area of visual difference in visual features of objects depicted in the captured video data and the projections; and
   when the one or more processors detect that a count of the one or more candidate change regions is below a threshold, update the stored model data with at least part of the captured video data based on the visual orientation and positioning information associated with the video data.

15. The system of claim 14, wherein the positioning information associated with the captured video data overlaps with positioning information for the 3D geometry.

16. The system of claim 15, wherein the one or more processors are further configured to determine a visual correlation between one or more objects depicted in the captured video data and one or more objects depicted in the projections.

17. The system of claim 14, wherein the detecting comprises comparing features in a certain area of a particular image from the captured video data with features in a corresponding image from the projections to obtain a difference value.

18. The system of claim 14, wherein updating the stored model data comprises:
   integrating images from the video data into the 3D geometry, and
   gradually applying visual changes from the integrated images to the 3D geometry.

19. The system of claim 18, wherein the one or more processors are further configured to determine an alignment of an integrated image based on a corresponding image from the projections.

20. The system of claim 19, wherein the one or more processors are further configured to adjust the alignment of the integrated image using visual orientation information associated with the corresponding image from the projections.

* * * * *